United States Patent
Suh

(10) Patent No.: US 7,359,304 B2
(45) Date of Patent: Apr. 15, 2008

(54) METHOD FOR RECORDING WOBBLE SIGNALS ON AN OPTICAL DISC AND OPTICAL DISC ON WHICH THE WOBBLE SIGNALS ARE RECORDED

(75) Inventor: Sang Woon Suh, Seoul (KR)

(73) Assignee: LG Electronics Inc., Seoul (KR)

(*) Notice: Subject to any disclaimer, the term of this patent is extended or adjusted under 35 U.S.C. 154(b) by 728 days.

(21) Appl. No.: 10/310,936

(22) Filed: Dec. 6, 2002

(65) Prior Publication Data

US 2003/0107970 A1    Jun. 12, 2003

(30) Foreign Application Priority Data

Dec. 6, 2001    (KR) .............................. 2001-77115

(51) Int. Cl.
*G11B 7/007*    (2006.01)
(52) U.S. Cl. ................................ 369/59.25; 369/44.13
(58) Field of Classification Search ............. 369/59.25, 369/44.13
See application file for complete search history.

(56) References Cited

U.S. PATENT DOCUMENTS

| | | | |
|---|---|---|---|
| 6,201,773 B1 * | 3/2001 | Aoki ...................... | 369/44.13 |
| 6,501,721 B2 * | 12/2002 | Hogan ...................... | 369/83 |
| 6,813,230 B1 * | 11/2004 | Ko et al. ................... | 369/47.1 |
| 6,947,364 B1 * | 9/2005 | Hogan et al. ............. | 369/53.45 |
| 2001/0030914 A1 | 10/2001 | Kim et al. | |
| 2001/0033543 A1 | 10/2001 | Akiyama et al. | |

FOREIGN PATENT DOCUMENTS

| | | |
|---|---|---|
| EP | 1 098 302 A2 | 5/2001 |
| EP | 1 150 283 A3 | 10/2001 |
| JP | 11-045441 | 2/1999 |
| WO | WO-98/54703 | 12/1998 |

* cited by examiner

*Primary Examiner*—Gautam R. Patel
(74) *Attorney, Agent, or Firm*—Birch, Stewart, Kolasch & Birch, LLP

(57) ABSTRACT

After pre-coding bit data of address information to be recorded on an optical disc on the basis of at least 4 wobble units, wobble data pre-coded on at least 4 wobble units is modulated by a BPSK (Binary Phase Shift Keying) or ASK (Amplitude Shift Keying) method, and the modulated wobble data is alternately recorded on both sides of a land and/or groove of the optical disc. As a result, wobble signals, recorded on sides of signal tracks of a groove and a land, in consecutively repeated anti-phase, or having consecutively repeated different amplitudes, are avoided. There are no consecutively repeated zero-level sections in a push-pull signal, thereby minimizing performance degradation of a wobble PLL (Phase-Locked Loop) and a noise generated in a reproduction RF signal.

15 Claims, 9 Drawing Sheets

Record Field | Header Field | Record Field

METHOD FOR RECORDING WOBBLE SIGNALS ON AN OPTICAL DISC AND OPTICAL DISC ON WHICH THE WOBBLE SIGNALS ARE RECORDED

BACKGROUND OF THE INVENTION

1. Field of the Invention

The present invention relates to an optical disc.

2. Description of the Related Art

Generally, optical discs being recording mediums for recording information such as video data, audio data, etc. are widely used. In addition to commercialized CDs (Compact Discs) as the optical discs, read-only optical discs such as a CD-ROM (Compact Disc-Read Only Memory), a DVD-ROM (Digital Versatile Disc-Read Only Memory), etc., write-once optical discs such as a CD-R (Compact Disc-Recordable), a DVD-R (Digital Versatile Disc-Recordable), etc., and rewritable optical discs such as a CD-RW (CD-Rewritable), a DVD-RAM (Compact Disc-Random Access Memory), a DVD-RW (DVD-Rewritable), etc. are currently supplied and developed.

Identification information containing address information, etc. is written on the rewritable optical disc so that data is written in a desired write location. As shown in FIG. 1, a signal track 10 of a land and a signal track 12 of a groove are arranged on the optical disc of the CD-R. The identification information containing the address information is pre-formatted on the signal track 12 of the groove wobbled according to a frequency-modulated carrier signal.

The address information is read from a wobble signal of the signal track 12 of the wobbled groove as described above, and data can be recorded on a specific location of the optical disc based on the read address information.

However, because the address information is recorded on only the signal track of the groove in a conventional optical disc, recording capacity for the address information is limited.

On the other hand, as an optical disc capable of recording the address information on both signal tracks of the land and the groove, an optical disc shown in FIG. 2, e.g., the DVD-RAM is known. The optical disc includes header fields having pre-pit arrays 14 in which identification information containing the address is recorded, and record fields having signal tracks 10 and 12 of the land and the groove wobbled in phase.

However, because data that a user desires to record cannot be recorded on the header fields made up of the pre-pit arrays 14 in the above-described optical disc, recording capacity for user data is limited.

On the other hand, a method for maximizing recording capacity by allowing the address information as wobble signals to be recorded on both signal tracks of the land and the groove is proposed. The method will be described in detail.

First, referring to FIG. 3, signal tracks 20 and 22 of a land and a groove are formed, and the signal tracks 20 and 22 are formed, in parallel, in a spiral form from an innermost circle to an outermost circle. As shown in FIG. 4, the signal tracks 20 and 22 can be alternately arranged for every rotation from the innermost circle to the outermost circle so that a spiral-shaped signal track can be formed.

On the other hand, the signal tracks 20 and 22 of lands and grooves include a pair of sides, wobbled in phase, corresponding to an in-phase wobbled portion 24A and another pair of sides, wobbled in anti-phase, an anti-phase wobbled portion 24B, wherein the pairs are alternately formed. The in-phase wobbled portion 24A and the anti-phase wobbled portion 24B are alternated in a width direction of the signal track.

Further, hatched in-phase wobbled portions 24A have the identification information containing the address information, etc. pre-formatted on both sides of each portion 24A. The identification information is wobbled according to a frequency-modulated carrier signal. The in-phase wobbled portions 24A and the anti-phase wobbled portions 24B are alternately arranged in traveling and width directions of the signal tracks 20 and 22. Both sides of each anti-phase wobbled portion 24B are wobbled in different phases.

Accordingly, the address information is obtained from a wobble signal on the in-phase wobbled portion 24A. For example, as shown in FIG. 3, where an in-phase wobbled portion and an anti-phase wobbled portion are used as one information-recording unit, i.e., a frame, the address information is read from in-phase wobbled portions located in the front and back of an anti-phase wobbled portion. On the basis of the read address information, user data can be recorded on the information-recording unit.

In a recording medium based on the above-described manner, information can be recorded on all the signal tracks of the lands and the grooves. Accordingly, all recordable portions of the recording medium can be utilized.

However, in a method for recording a wobble signal on each of the signal tracks of the land and the groove, one period signal is allocated to one bit of the address information. Because the signal is phase-modulated and the phase-modulated signal is recorded, a valid address or an invalid address can be detected according to a tracking state of an optical pickup.

For example, as shown in FIG. 5, where beam spots of the optical pickup are appropriately arranged on both sides of a signal track of a groove, phases of wobble signals formed on both sides of a signal track of a groove are in phase, and a push-pull signal having an amplified signal level of a waveform corresponding to each wobble signal is outputted. A digital wobble signal is detected as a sliced push-pull signal, and a reproduction RF (Radio Frequency) signal of a zero level is outputted. However, where the beam spots of the optical pickup are not appropriately arranged on both sides of a signal track of a land, phases of the wobble signals formed on both sides of a signal track of a land may be in anti-phase. In this case, since consecutively repeated zero-level sections exist in the push-pull signal, a digital wobble signal sliced to a predetermined level also has the consecutively repeated zero-level sections, resulting in generating a signal having an irregular period. Accordingly, there are problems in that performance of a PLL (Phase-Locked Loop) is significantly degraded and a noise is generated in a reproduction RF signal.

SUMMARY OF THE INVENTION

Therefore, the present invention has been made in view of the above problems, and it is an object of the present invention to provide a method for recording wobble signals on an optical disc, the method being capable of recording wobble signals being address information on both sides of a signal track of a groove or land of the optical disc so that a push-pull signal does not have consecutively repeated zero-level sections when the optical disk is reproduced.

It is another object of the present invention to provide an optical disc on which wobble signals, being address information on both sides of a signal track of a groove or land of the optical disc, are recorded so that a push-pull signal does not have consecutively repeated zero-level sections when the optical disk is reproduced.

In accordance with one aspect of the present invention, the above and other objects can be accomplished by the provision of a method for recording wobble signals on a optical disc, comprising the steps of: a) pre-coding bit data of address information, to be recorded on the optical disc, on the basis of at least 4 wobble units; and b) modulating the pre-coded wobble data and alternately recording the modulated wobble data on both sides of a land and/or groove of the optical disc.

In accordance with another aspect of the present invention, there is provided an optical disc, comprising: signal tracks of a land and a groove, in which wobble signals are alternately recorded on sides of the signal tracks, wherein the wobble signals are modulated and recorded so that a phase of a wobble signal recorded on a side of the signal track of the groove and a phase of a wobble signal recorded on a side of the signal track of the land are not consecutively repeated in anti-phase.

In accordance with yet another aspect of the present invention, there is provided an optical disc, comprising: signal tracks of a land and a groove, in which wobble signals are alternately recorded on sides of the signal tracks, wherein the wobble signals are modulated and recorded so that amplitude of the wobble signals recorded on a side of the signal track of the groove and amplitude of the wobble signals recorded on a side of the signal track of the land are not consecutively repeated while the amplitudes are different.

BRIEF DESCRIPTION OF THE DRAWINGS

The above and other objects, features and other advantages of the present invention will be more clearly understood from the following detailed description taken in conjunction with the accompanying drawings, in which.

DESCRIPTION OF THE PREFERRED EMBODIMENTS

Now, preferred embodiments of a method for recording wobble signals on an optical disc and an optical disc on the wobble signals are recorded in accordance with the present invention will be described in detail with reference to the annexed drawings.

Figure 6:
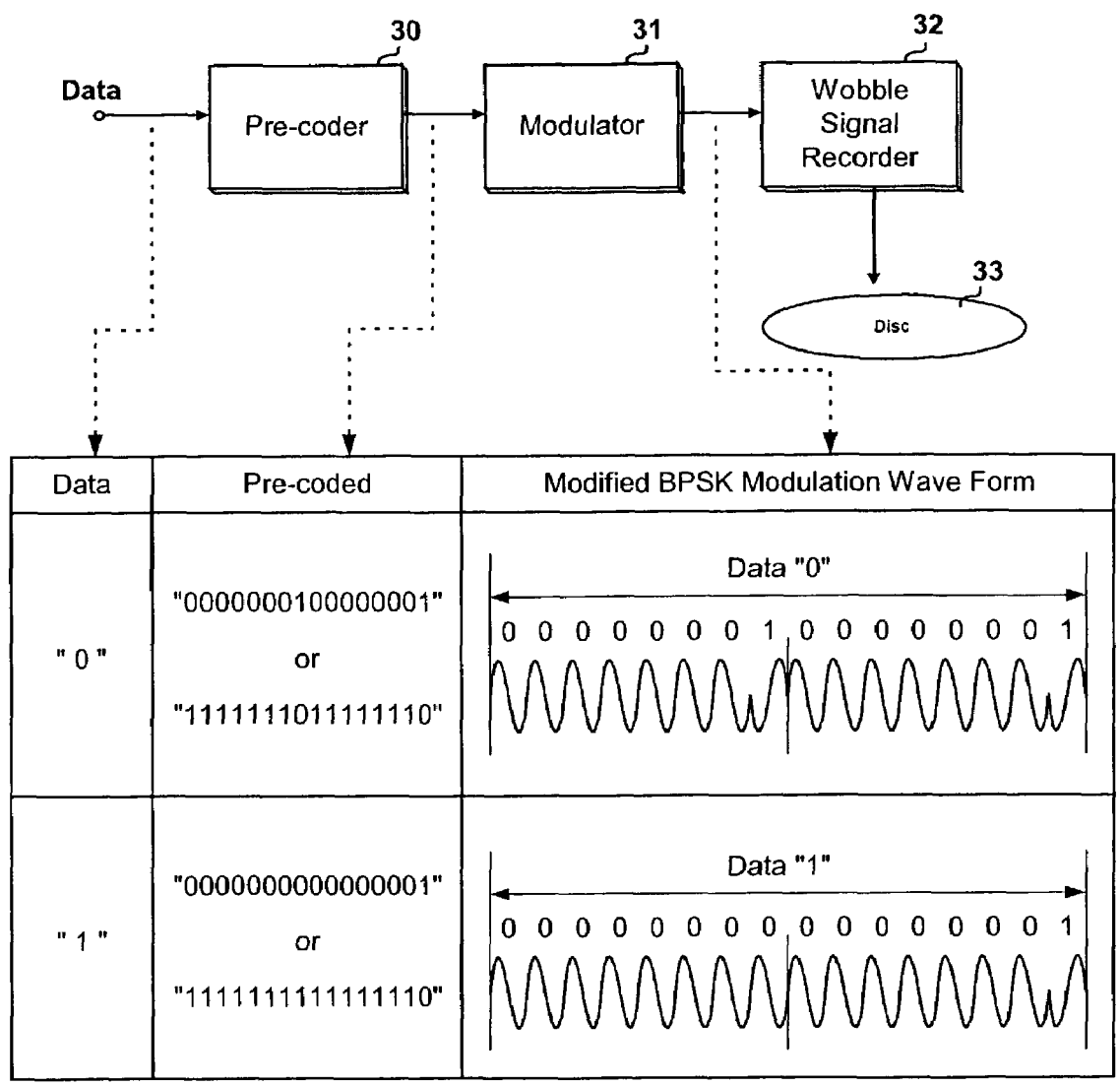
FIG. 6 is a view illustrating a configuration of an apparatus for recording a wobble signal using a method for recording wobble signals in accordance with the present invention.

FIG. 6 is a view illustrating a configuration of an apparatus for recording wobble signals using a method for recording wobble signals in accordance with the present invention. The wobble-signal recording apparatus includes a pre-coder 30, a modulator 31 and a wobble signal recorder 32. The pre-coder 30 pre-codes one-bit data of address information to be recorded on the optical disc on the basis of at least four wobble units. The modulator 31 modulates data pre-coded on the basis of at least four wobble units to a wobble signal with a BPSK (Binary Phase Shift Keying) method. The wobble signal recorder 32 records the wobble signal modulated by the BPSK method on a rewritable optical disc 33.

The pre-coder 30 pre-codes bit data of the address information to be recorded on the optical disc on the basis of at least four wobble units, i.e., wobble units of (2n+2) (n is a natural number) wobbles or more. For example, where address information is pre-coded on the basis of 16 wobble units, address information "0" of one bit is pre-coded to "0000000100000001". Address information "1" of one bit is pre-coded to "0000000000000001". In another example, the address information "0" of one bit can be pre-coded to "1111111011111110", and the address information "1" of one bit can be pre-coded to "1111111111111110".

That is, when the pre-coder 30 pre-codes bit data of "0" and "1" on the basis of 16 wobble units, two pieces of the pre-coded data corresponding to the address information "0" and "1" have only one different bit of 16 bits and the remaining 15 bits having the same bit data as each other.

Where the address information "0" of one bit is pre-coded to "0000000100000001", and the address information "1" of one bit is pre-coded to "0000000000000001", the modulator 31 outputs a modulation signal of the BPSK method corresponding to the data pre-coded on the basis of 16 wobble units as shown in FIG. 6.

Modulation signals corresponding to pieces of the address information "0" and "1" have an anti-phase signal corresponding to the different one bit, and in-phase signals corresponding to the same 15 bits.

Figure 7:
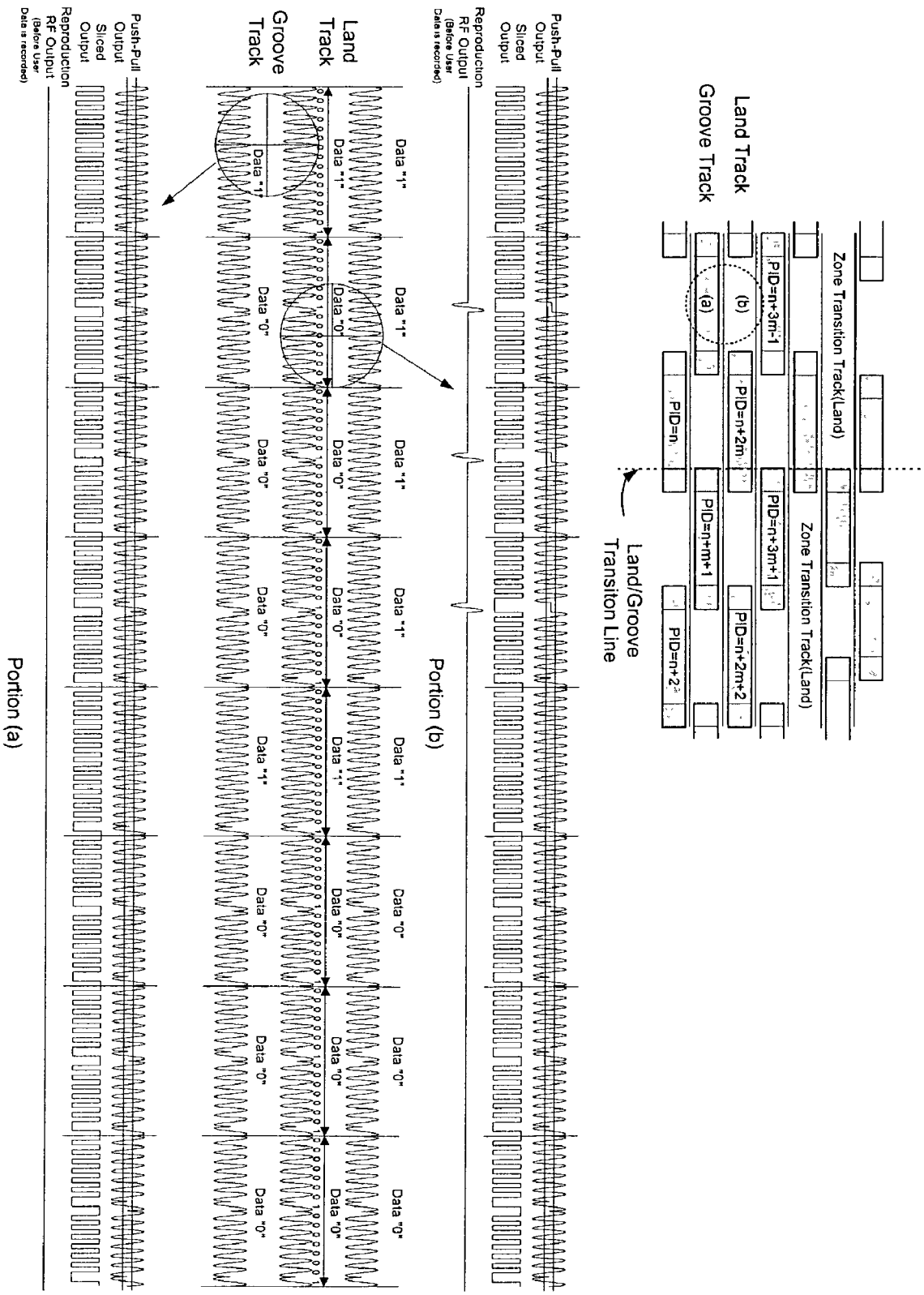
FIG. 7 is a view illustrating waveforms of a push-pull signal, a sliced signal and a reproduction RF signal read from an optical disc in accordance with the present invention.

For example, where pieces of address information of "10001000" are pre-coded on the basis of 16 wobble units and data pre-coded on the basis of 16 wobble units is modulated and recorded by the BPSK method, modulation signals with no consecutively repeated anti-phase signals are alternately recorded on sides of signal tracks of a land and a groove as shown in FIG. 7.

Figure 1:
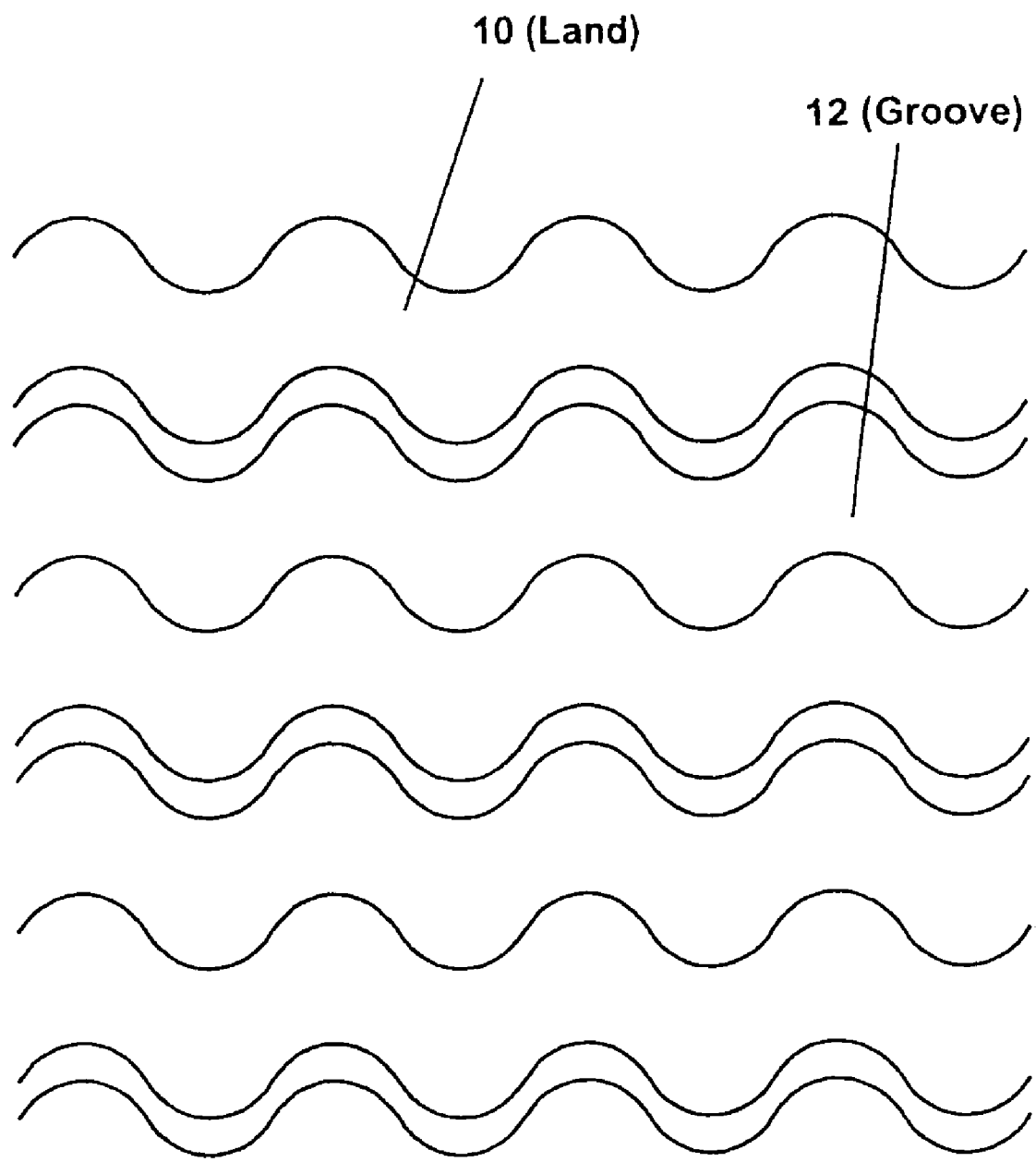
FIG. 1 is a view illustrating signal tracks of a land and a groove formed on an optical disc such as a conventional CD-R (Compact Disc-Recordable)
Figure 2:
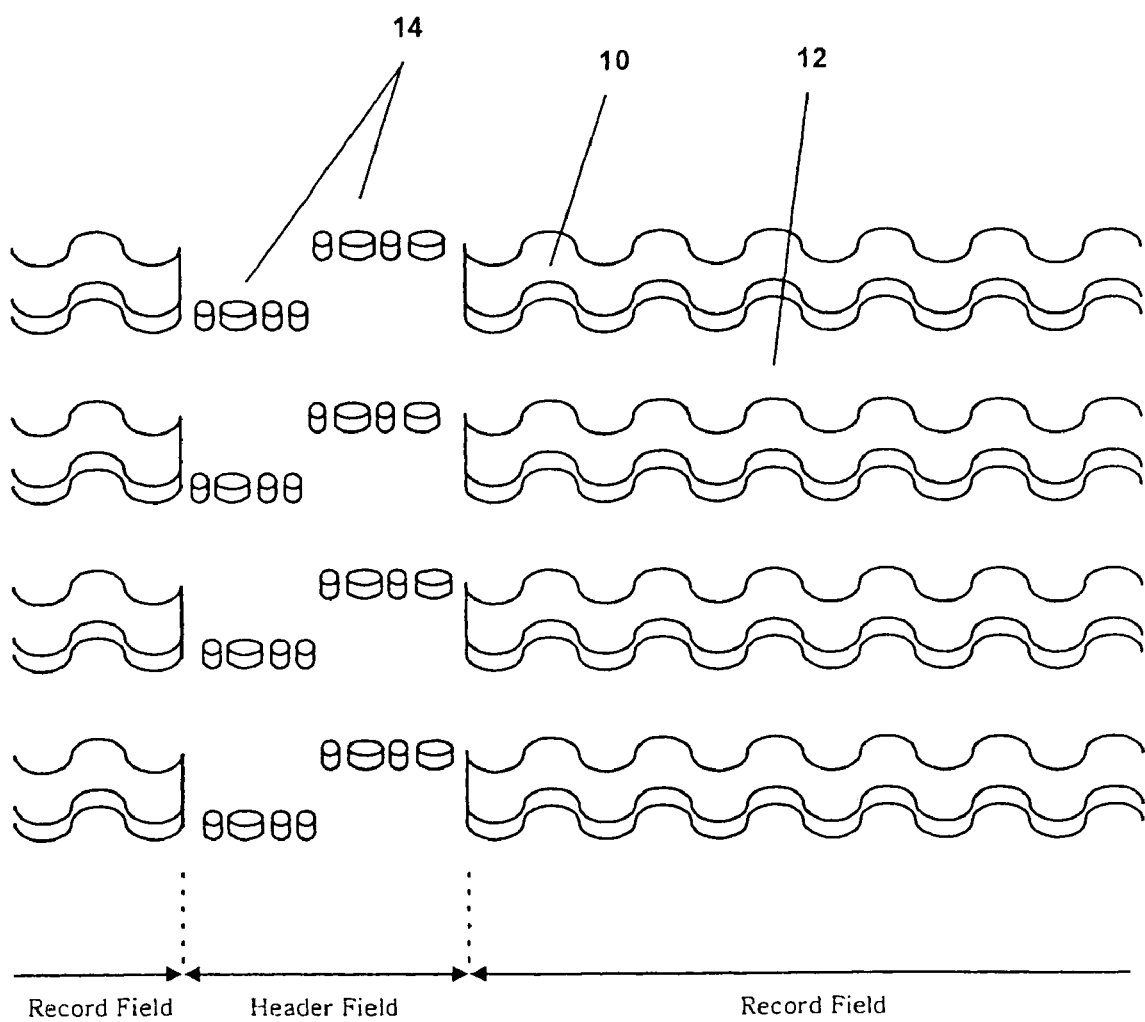
FIG. 2 is a view illustrating signal tracks of a land and a groove formed on an optical disc such as a conventional DVD-ROM (Digital Versatile Disc-Read Only Memory)
Figure 3:
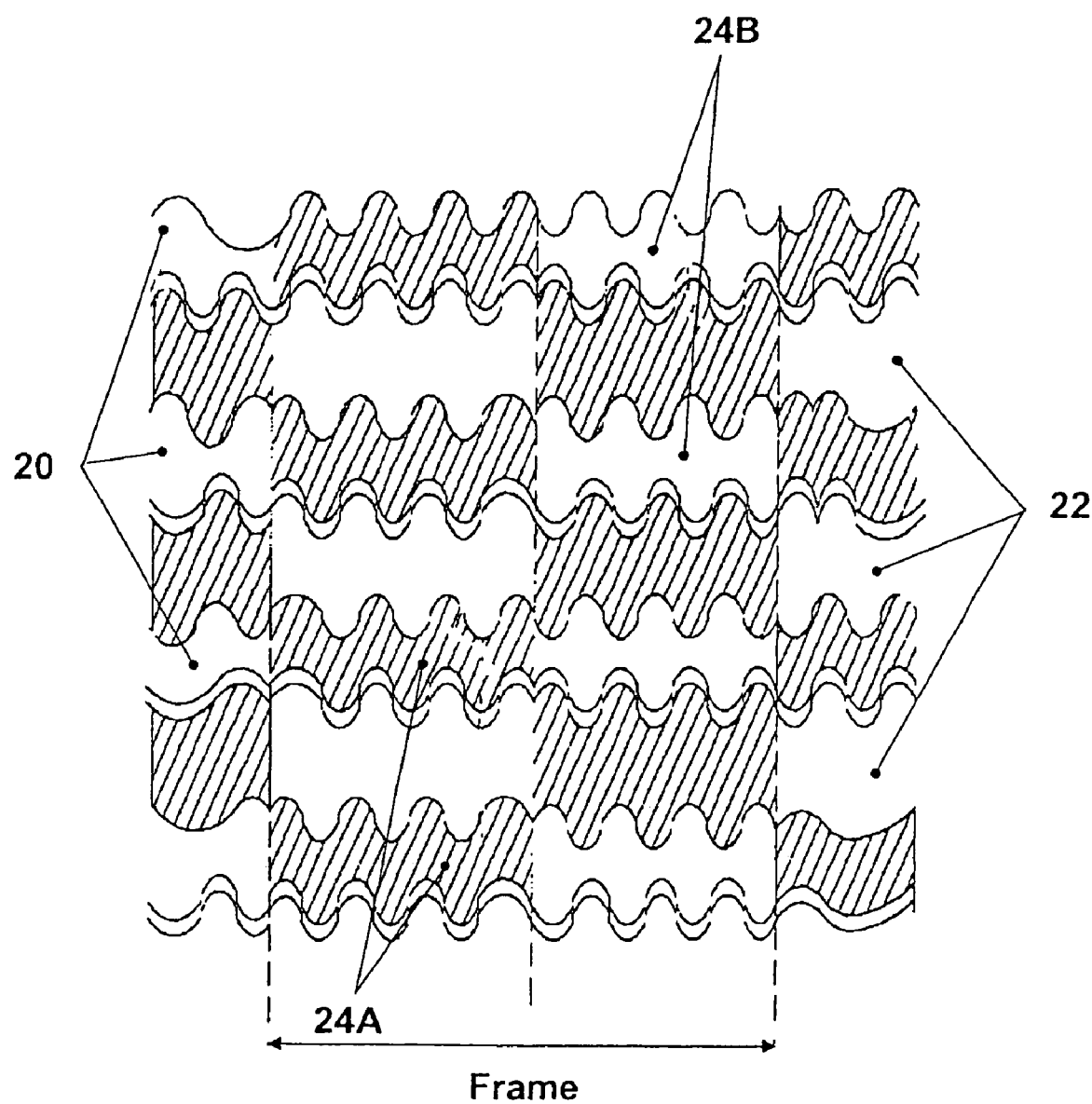
FIGS. 3 and 4 are views illustrating optical discs in which wobble signals are recorded on both lands and grooves.
Figure 4:
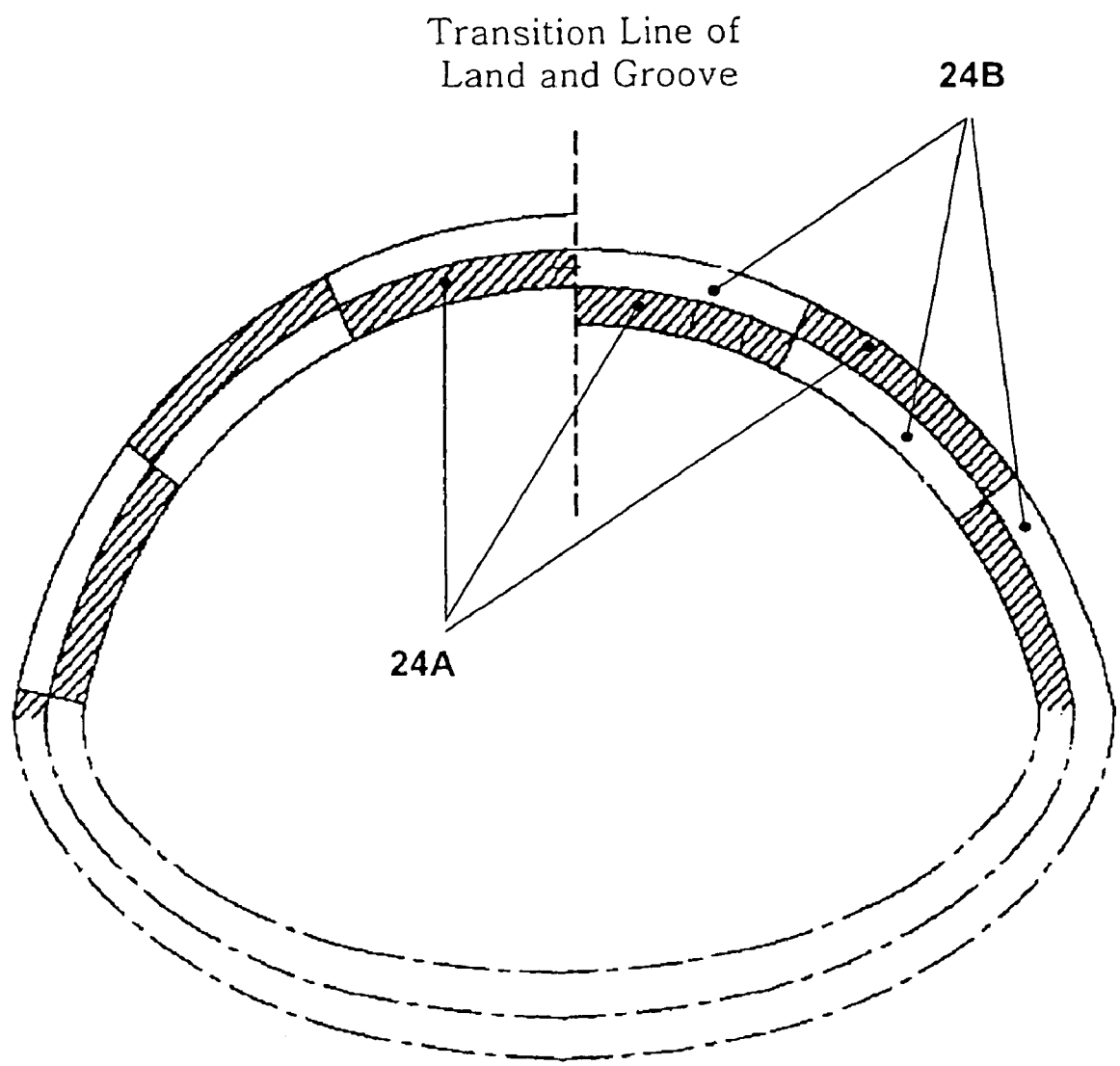
Figure 5:
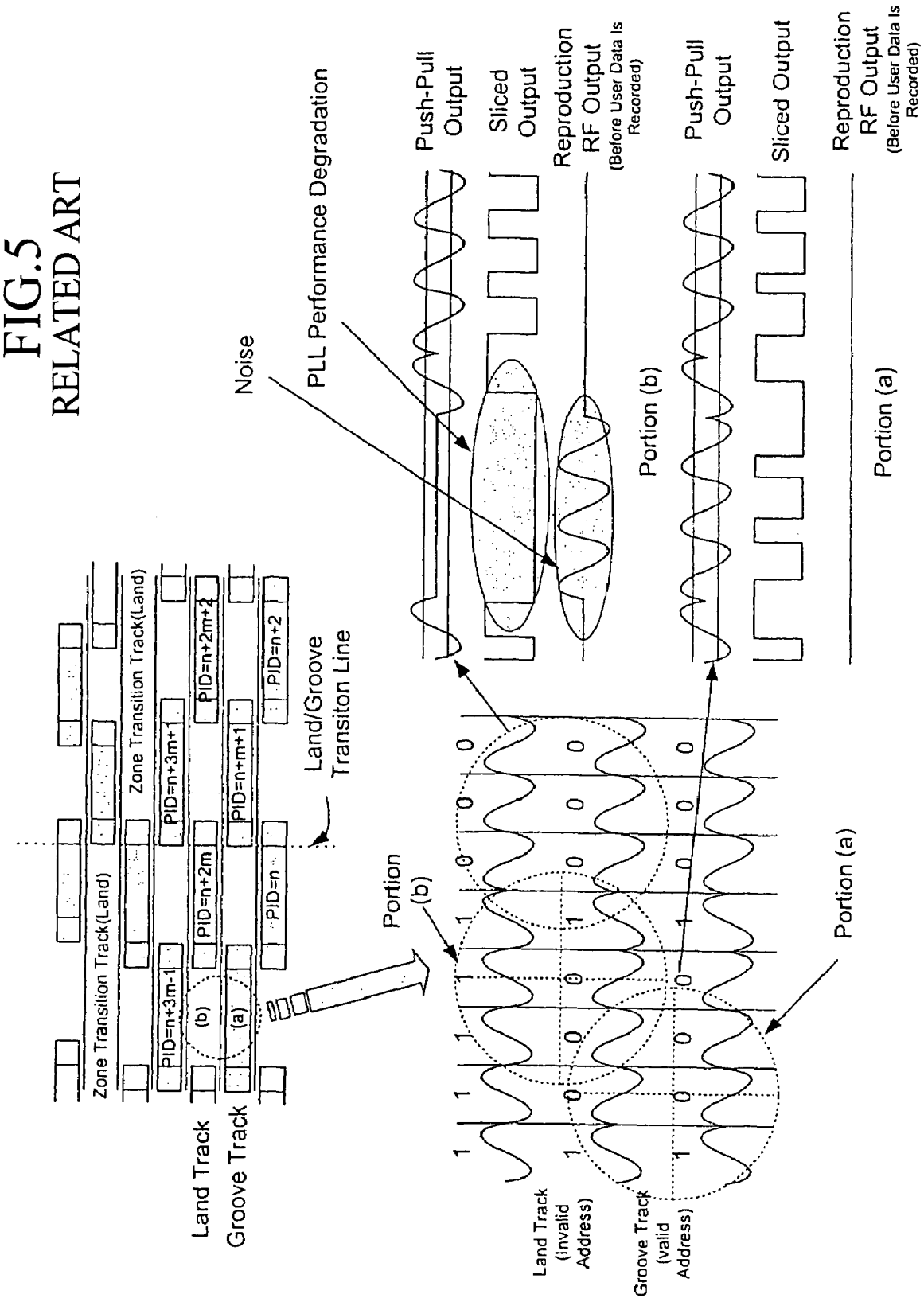
FIG. 5 is a view illustrating waveforms of a push-pull signal, a sliced signal and a reproduction RF signal read from an optical disc on which a wobble signal is recorded by a conventional phase modulation method.

Accordingly, as described in connection with FIG. 5, where beam spots of an optical pickup are appropriately arranged on both sides of the signal track of the groove, wobble signals formed on both sides the signal track of the groove are in phase, and a push-pull signal having an amplified signal level of a waveform corresponding to each wobble signal is appropriately outputted. A digital wobble signal is detected as a sliced push-pull signal, and a reproduction RF signal of a zero level is outputted.

As shown in FIG. 7, where the beam spots of the optical pickup are not appropriately arranged on both sides of a signal track of a land and both sides of the signal track of the groove, phases of most wobble signals formed on the sides a signal track of a land can be in phase and only a signal corresponding to data of one bit of predetermined bits is in anti-phase as compared with other signals. Accordingly, there are no consecutively repeated anti-phase signals. Moreover, because a push-pull signal having a very short zero-level section is detected, performance of a PLL (Phase-Locked Loop) is not degraded and a noise in a reproduction RF signal can be avoided.

Figure 8:
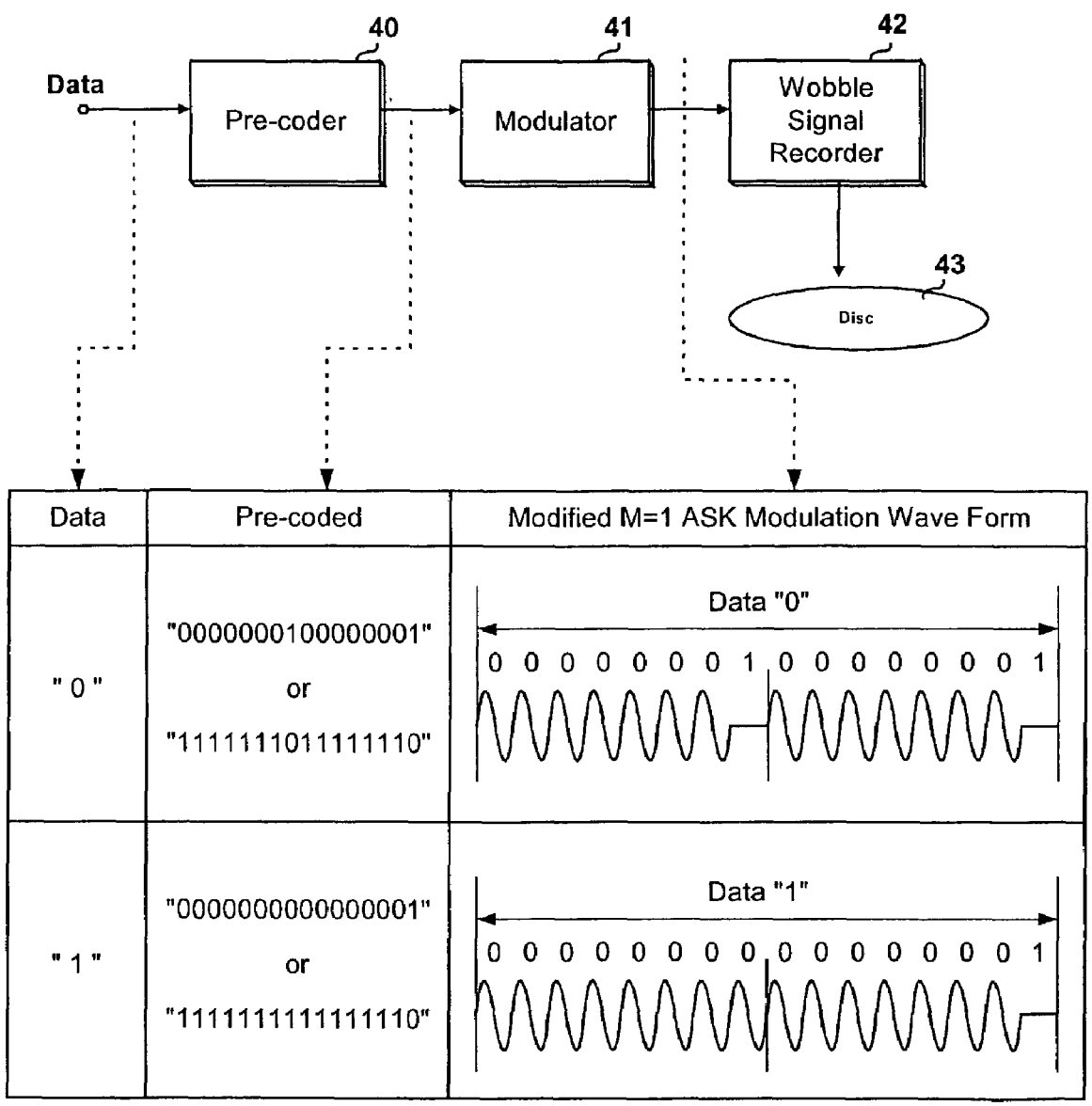
FIG. 8 is a view illustrating a configuration of an apparatus for recording a wobble signal using a method for recording wobble signals in accordance with another embodiment of the present invention.
Figure 9:
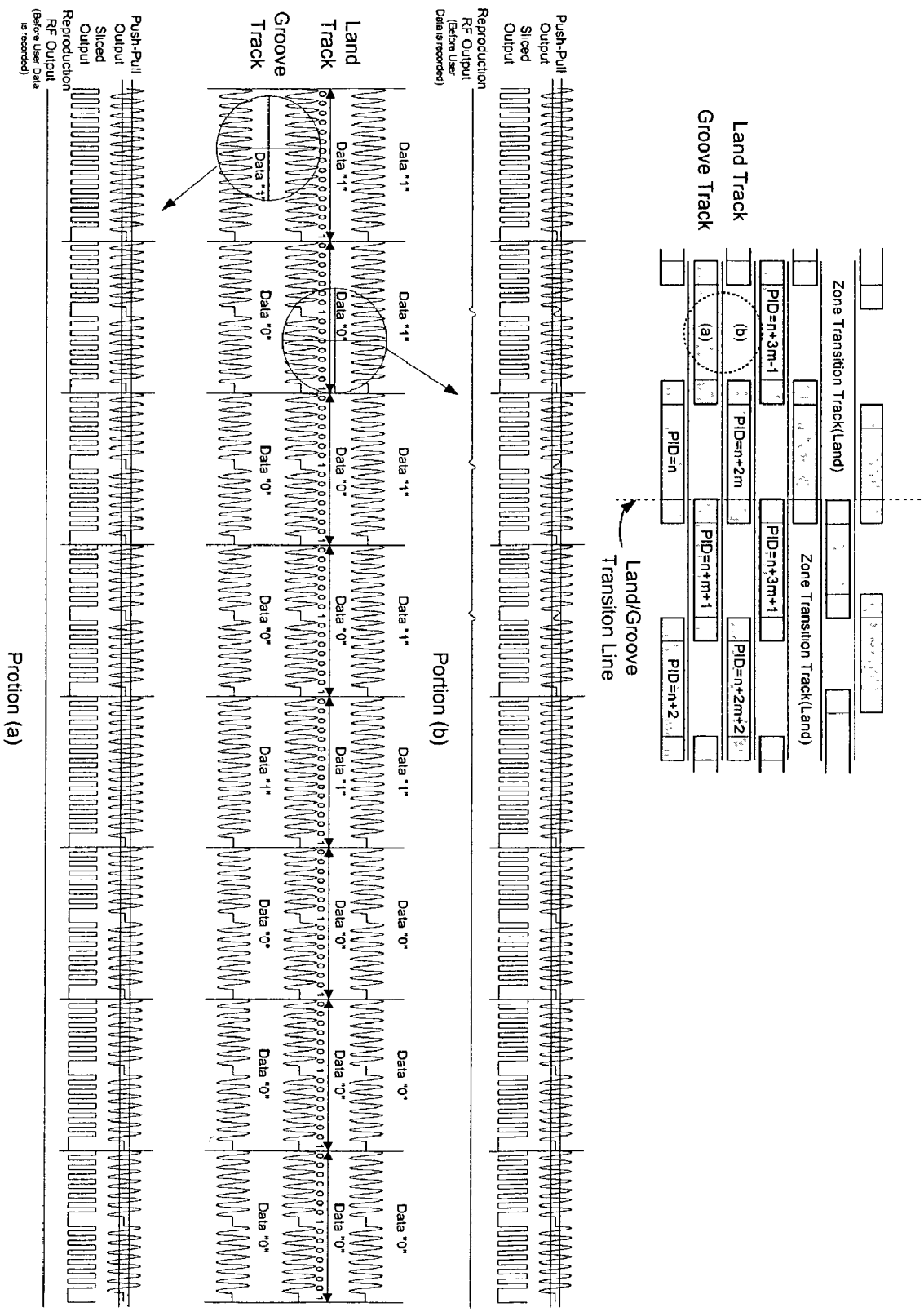
FIG. 9 is a view illustrating waveforms of a push-pull signal, a sliced signal and a reproduction RF signal read from an optical disc in accordance with another embodiment of the present invention.

FIG. 8 is a view illustrating a configuration of an apparatus for recording a wobble signal using a method for recording wobble signals on an optical disc in accordance with another embodiment of the present invention. The wobble-signal recording apparatus includes a pre-coder 40, a modulator 41 and a wobble signal recorder 42. The pre-coder 40 pre-codes bit data of the address information to be recorded on the optical disc on the basis of at least four wobble units, i.e., wobble units of (2n+2) (n is a natural number) wobbles or more. As shown in FIG. 9, the modulator 41 amplitude-modulates data pre-coded on the basis of wobble units of (2n+2) wobbles with an ASK (Amplitude Shift Keying) method.

Pieces of the pre-coded data corresponding to bit data of "0" and "1" modulated by the modulator 41 have same amplitudes of in-phase signals except for one different amplitude corresponding to one different bit. For example, where address information "10001000" is pre-coded on the basis of 16 wobble units and the pre-coded data based on the 16 wobble units is amplitude-modulated by the ASK method and the modulated data is recorded, ASK modulation signals with no consecutively repeated zero-level amplitudes on the rewritable optical disc as shown in FIG. 9 are alternately recorded.

Accordingly, where beam spots of an optical pickup are appropriately arranged on both sides of the signal track of the groove, wobble signals formed on both sides the signal track of the groove are in phase and have the same amplitudes, and a push-pull signal having an amplified signal level of a waveform corresponding to each wobble signal is outputted. A digital wobble signal is detected as a sliced push-pull signal, and a reproduction RF signal of a zero level is outputted.

As shown in FIG. 9, also where the beam spots of the optical pickup are not appropriately arranged on both sides of a signal track of a land and both sides of the signal track of the groove, phases of most wobble signals formed on the sides of a signal track of a land can be in phase and only a signal corresponding to data of one bit of predetermined bits is in anti-phase as compared with other signals. Accordingly, there are no consecutively repeated anti-phase signals. Moreover, because a push-pull signal having a very short zero-level section is detected, performance of a PLL (Phase-Locked Loop) is not degraded and a noise of a reproduction RF signal can be avoided.

As apparent from the above description, the present invention can prevent the case where wobble signals, recorded on sides of signal tracks of a groove and a land, in anti-phase are consecutively repeated. Further, the present invention can prevent the case where wobble signals, recorded on sides of signal tracks of a groove and a land, having different amplitudes are consecutively repeated. Accordingly, there are no consecutively repeated zero-level sections in a push-pull signal, thereby minimizing performance degradation of a wobble PLL and a noise generated in a reproduction RF signal.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A method for recording wobble signals on an optical disc, comprising the steps of:
    a) pre-coding "0" and "1" bit data of address information, to be recorded on the optical disc, on the basis of at least 4 wobble units, respectively; and
    b) modulating the pre-coded wobble data and alternately recording the modulated wobble data on a land and/or groove of the optical disc;
    wherein the pre-coded wobble data representing "0" and "1" bit data of address information has at least two same values and at least one different value at respective wobble units, thereby distinguishing "0" bit data from "1" bit data.

2. The method as set forth in claim 1, wherein the pre-coded bit data of "0" and "1" of address information has a different value at only one wobble unit.

3. The method as set forth in claim 1, wherein the step b) is carried by modulating the pre-coded wobble data with a BPSK (Binary Phase Shift Keying) method, and alternately recording the modulated wobble data on both sides of the land and/or groove of the optical disc.

4. The method as set forth in claim 1, wherein the step b) is carried by modulating the pre-coded wobble data with an ASK (Amplitude Shift Keying) method, and alternately recording the modulated wobble data on both sides of the land and/or groove of the optical disc.

5. The method as set forth in claim 1, wherein the same value indicates a same phase and the different value indicates a different phase.

6. The method as set forth in claim 1, wherein the pre-coded wobble data is comprised by at least 2n+2 wobble units, where n is a natural number.

7. The method of claim 1, wherein the pre-coding is on the basis of (2n+2) wobble units, respectively, where n is natural number greater than 1.

8. An optical disc including wobble signals recorded in signal track, characterized in that "0" and "1" bit data of address information is pre-coded on the basis of at least 4 wobble units, and the pre-coded data is modulated and recorded as a modulated wobble data on a land and/or a groove of the optical disc,
    wherein pre-coded data representing "0" and "1 bit data of address information has at least two same values and at least one different value at respective wobble units.

9. The method as set forth in claim 8, wherein the pre-coded bit data of "0" and "1" of address information has a different value at only one wobble unit.

10. The optical disc of claim 8, wherein the pre-coded wobble data is modulated by a BPSK (Binary Phase Shift Keying) method, and alternately recorded as the modulated wobble data on both sides of the land and/or groove of the optical disc.

11. The optical disc of claim 10, wherein pre-coded data representing "0" and "1" bit data of address information is comprised by at least 2n+2 wobble units, where n is a natural number.

12. The optical disc of claim 8, wherein the pre-coded wobble data is modulated by an ASK (Amplitude Shift Keying) method, and alternately recorded as the modulated wobble data on both sides of the land and/or groove of the optical disc.

13. The optical disc of claim 8, wherein the same value indicates a same phase and the different value indicates a different phase.

14. The optical disc of claim 9, wherein the pre-coding is on the basis of (2n+2) wobble units, respectively, where n is natural number greater than 1.

15. A device for recording wobble signals on an optical disc, comprising:
- a pre-coder configured to pre-code "0" and "1" bit data of address information, to be recorded on the optical disc, on the basis of at least 4 wobble units, respectively;
- a modulator configured to modulate the pre-coded wobble data; and
- a recording unit configured to alternately record the modulated wobble data on a land and/or groove of the optical disc,
- wherein the pre-coded wobble data representing "0" and "1" bit data of address information has at least two same values and at least one different value at respective wobble units, thereby distinguishing "0" bit data from "1" bit data.

* * * * *